United States Patent
Musick et al.

(10) Patent No.: US 7,152,070 B1
(45) Date of Patent: Dec. 19, 2006

(54) SYSTEM AND METHOD FOR INTEGRATING AND ACCESSING MULTIPLE DATA SOURCES WITHIN A DATA WAREHOUSE ARCHITECTURE

(75) Inventors: Charles R. Musick, Castro Valley, CA (US); Terence Critchlow, Livermore, CA (US); Madhaven Ganesh, San Jose, CA (US); Tom Slezak, Livermore, CA (US); Krzysztof Fidelis, Brentwood, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/479,432

(22) Filed: Jan. 7, 2000

Related U.S. Application Data

(60) Provisional application No. 60/115,449, filed on Jan. 8, 1999.

(51) Int. Cl.
G06F 7/00 (2006.01)
G06F 9/44 (2006.01)

(52) U.S. Cl. .............. 707/101; 707/100; 707/102; 707/104.1; 707/103 R; 717/108; 717/107; 717/106; 717/118

(58) Field of Classification Search .............. 707/1–10, 707/100–102.1, 103–104.1; 717/106–108, 717/116, 118
See application file for complete search history.

(56) References Cited

U.S. PATENT DOCUMENTS

| | | | |
|---|---|---|---|
| 5,781,906 A * | 7/1998 | Aggarwal et al. .......... 707/102 |
| 5,832,496 A * | 11/1998 | Anand et al. ............... 707/102 |
| 5,870,746 A * | 2/1999 | Knutson et al. ............. 707/10 |
| 5,937,409 A * | 8/1999 | Wetherbee .............. 707/103 R |
| 5,973,408 A * | 10/1999 | Nagasaka et al. ........... 257/751 |
| 5,987,247 A * | 11/1999 | Lau ............................ 717/100 |
| 6,055,543 A * | 4/2000 | Christensen et al. ..... 707/104.1 |
| 6,101,483 A * | 8/2000 | Petrovich et al. ............. 705/26 |
| 6,128,624 A * | 10/2000 | Papierniak et al. ...... 707/104.1 |
| 6,167,563 A * | 12/2000 | Fontana et al. ............. 717/107 |
| 6,170,081 B1 * | 1/2001 | Fontana et al. ............... 707/10 |
| 6,182,277 B1 * | 1/2001 | DeGroot et al. ............ 717/115 |

(Continued)

OTHER PUBLICATIONS

Critchlow et al.—"An Overview of Bioinformatics Research at Lawrence Livermore National Laboratory"—Center for applied Scientic Computing—UCRL-JC-138042 (www.llnl.gov/casc/people/critchlow/pubd/abl-2000.pdf) (pp. 1-5).*

Primary Examiner—Jean M. Corrielus
Assistant Examiner—Anh Ly
(74) Attorney, Agent, or Firm—John P. Wooldridge; Michael C. Staggs

(57) ABSTRACT

A system and method is disclosed for integrating and accessing multiple data sources within a data warehouse architecture. The metadata formed by the present method provide a way to declaratively present domain specific knowledge, obtained by analyzing data sources, in a consistent and useable way. Four types of information are represented by the metadata: abstract concepts, databases, transformations and mappings. A mediator generator automatically generates data management computer code based on the metadata. The resulting code defines a translation library and a mediator class. The translation library provides a data representation for domain specific knowledge represented in a data warehouse, including "get" and "set" methods for attributes that call transformation methods and derive a value of an attribute if it is missing. The mediator class defines methods that take "distinguished" high-level objects as input and traverse their data structures and enter information into the data warehouse.

28 Claims, 10 Drawing Sheets

U.S. PATENT DOCUMENTS

| | | | |
|---|---|---|---|
| 6,184,891 B1 * | 2/2001 | Blinn | 345/426 |
| 6,199,195 B1 * | 3/2001 | Goodwin et al. | 707/100 |
| 6,223,186 B1 * | 4/2001 | Rigault et al. | 707/104.1 |
| 6,377,993 B1 * | 4/2002 | Brandt et al. | 709/227 |
| 6,411,961 B1 * | 6/2002 | Chen | 707/102 |
| 6,480,850 B1 * | 11/2002 | Veldhuisen | 707/9 |
| 6,484,214 B1 * | 11/2002 | Sundermier | 719/332 |
| 6,523,172 B1 * | 2/2003 | Martinez-Guerra et al. | 717/143 |
| 6,615,258 B1 * | 9/2003 | Barry et al. | 709/223 |

* cited by examiner

SYSTEM AND METHOD FOR INTEGRATING AND ACCESSING MULTIPLE DATA SOURCES WITHIN A DATA WAREHOUSE ARCHITECTURE

RELATED APPLICATIONS

This application claims the benefit of U.S. Provisional Application No. 60/115,449, filed Jan. 8, 1999, entitled Datafoundry Software, which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to systems and methods for data integration and management, and more particularly for integrating and accessing multiple data sources within a data warehouse architecture through such techniques as automatic generation of mediators which accept data in a specific format, perform transformations on and store the data.

2. Discussion of Background Art

Data warehousing is an approach for managing data from multiple sources by representing a single, consistent view it. One of the more typical data warehouse architectures, the mediated data warehouse, uses a series of data source specific wrapper and mediator layers to integrate the data into the consistent format required by the warehouse. Commercial data warehousing products have been produced by companies such as RebBrick, IBM, Brio, Andyne, Ardent, NCR, Information Advantage, Informatica, and others. Furthermore, some companies use relational databases, such as those sold by Oracle, IBM, Informix and Sybase, to develop their own in-house data warehousing solution.

These approaches are successful when applied to traditional business data because the data format used by the individual data sources tends to be rather static. Therefore, once a data source has been integrated into a data warehouse, there is relatively little work required to maintain that connection. However, that is not the case for all data sources. Some data sources, in particular within certain domains, tend to regularly change their data model, format and/or interface. This is problematic because each change requires the warehouse administrator to update the wrapper, mediator, and warehouse to properly read, interpret, and represent the new format. Because these updates can be difficult and time consuming, the regularity of data source format changes effectively limits the number of sources that can be integrated into a single data warehouse.

In order to increase the number of dynamic data sources that can be integrated into a warehouse, the cost of maintaining the warehouse must be decreased. This could be accomplished by some combination of reducing the cost to maintain the wrapper, the mediator, and the warehouse data store.

In response to the concerns discussed above, what is needed is a system and method for reducing the cost of data warehouses that integrate and provide access to multiple data sources, overcoming the problems of the prior art.

SUMMARY OF THE INVENTION

The present invention is a system and method for integrating and accessing multiple data sources within a data warehouse architecture. The system and method of the present invention are particularly advantageous over the prior art because a set of metadata is formed, providing a way to declaratively present domain specific knowledge, obtained by analyzing data sources, in a consistent and useable way. Four types of information are represented by the metadata: abstract concepts, databases descriptions, transformations and mappings.

Also, a mediator generator automatically generates data management computer code based on the metadata. The resulting code defines a translation library and a mediator class. The translation library provides a data representation for domain specific knowledge represented in a data warehouse, including "get" and "set" methods for attributes that call transformation methods and derive a value of an attribute if it is missing. The mediator class defines methods that take "distinguished" high-level objects as input and traverse their data structures and enter information into the data warehouse.

The invention includes a method for maintaining a data warehouse, including the steps of identifying a data source of interest, updating metadata to reflect information available from the source, automatically generating a mediator based on the metadata and writing a wrapper for the source which calls the mediator. A data warehouse is defined to be any code system for integrating multiple data sources, regardless of whether the approach is based on federated database, multidatabase, or traditional warehousing technology, and independent of the computer-useable medium on which the code is stored. Metadata is defined to be equivalent to ontology. The step of updating metadata includes entering new types of information, new data formats for previously defined information, new transformations between data formats, and the schema of the source. A stand-alone mediator generation program automatically generates a fully functional mediator. An API and translation libraries are automatically defined by the mediator generation program. The wrapper makes use of the mediator. The mediator may comprise code to translate between source and target representations, possibly using externally defined methods, and load data into the warehouse. The wrapper uses the API and public data structures defined by the mediator generation program. The mediator transforms and loads data into the warehouse.

The DataFoundry metadata model includes abstractions, translations, mappings and database descriptions. The model is described by a UML DataFoundry metadata representation, wherein the model defines the metadata used by a mediator generation program. The mediator generation program includes the steps of reading the metadata; generating translation libraries; generating an API; reading the metadata; and generating said mediator. Reading the metadata includes the steps of reading the abstraction metadata; reading the translation metadata; reading the database description metadata; and reading the mapping metadata. Translation libraries are generated by developing public and private class definitions and implementations of data structures, where the data structures comprise the abstractions and the translations.

Generating the mediator consists of creating public and private definitions and implementations of a class or classes capable of receiving data in one format, converting it to another format, and loading it into a data warehouse. Data is received by a receiving data structure defined within the translation library and is loaded into a warehouse whose schema corresponds to the database description component of the metadata. The method may be applied to a number of applications including data warehousing applications in the domain of protein sequence and structure analysis, data warehousing applications in the domain of functional genomics and proteomics, integrating a new data source into a data warehouse and updating a warehouse when a previously integrated data source is modified.

These and other aspects of the invention will be recognized by those skilled in the art upon review of the detailed description, drawings, and claims set forth below.

DETAILED DESCRIPTION OF THE PREFERRED EMBODIMENT

Figure 1:
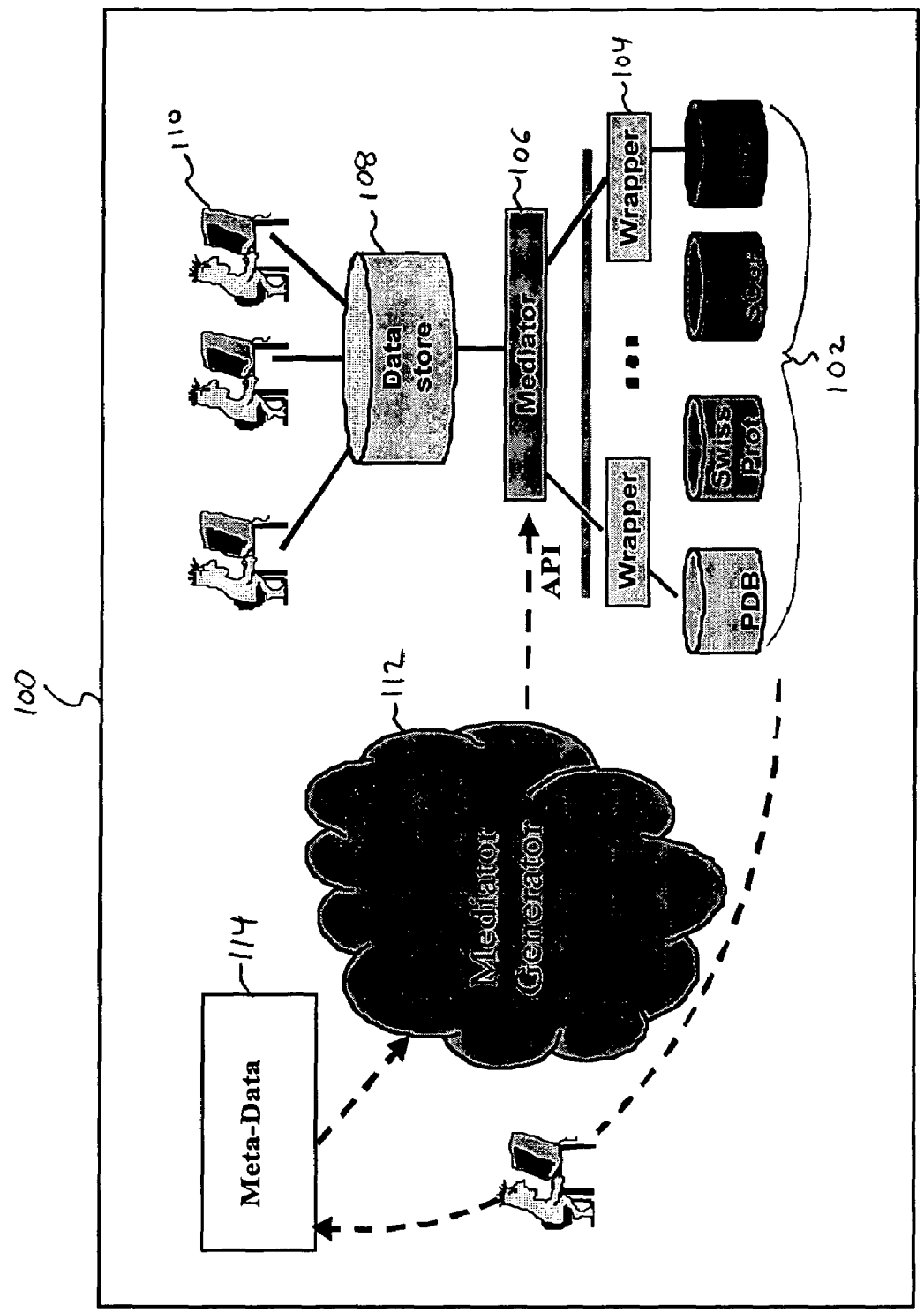
FIG. 1 is a dataflow diagram of a system for integrating and accessing multiple data sources within a data warehouse architecture according to the present invention.
Figure 2:
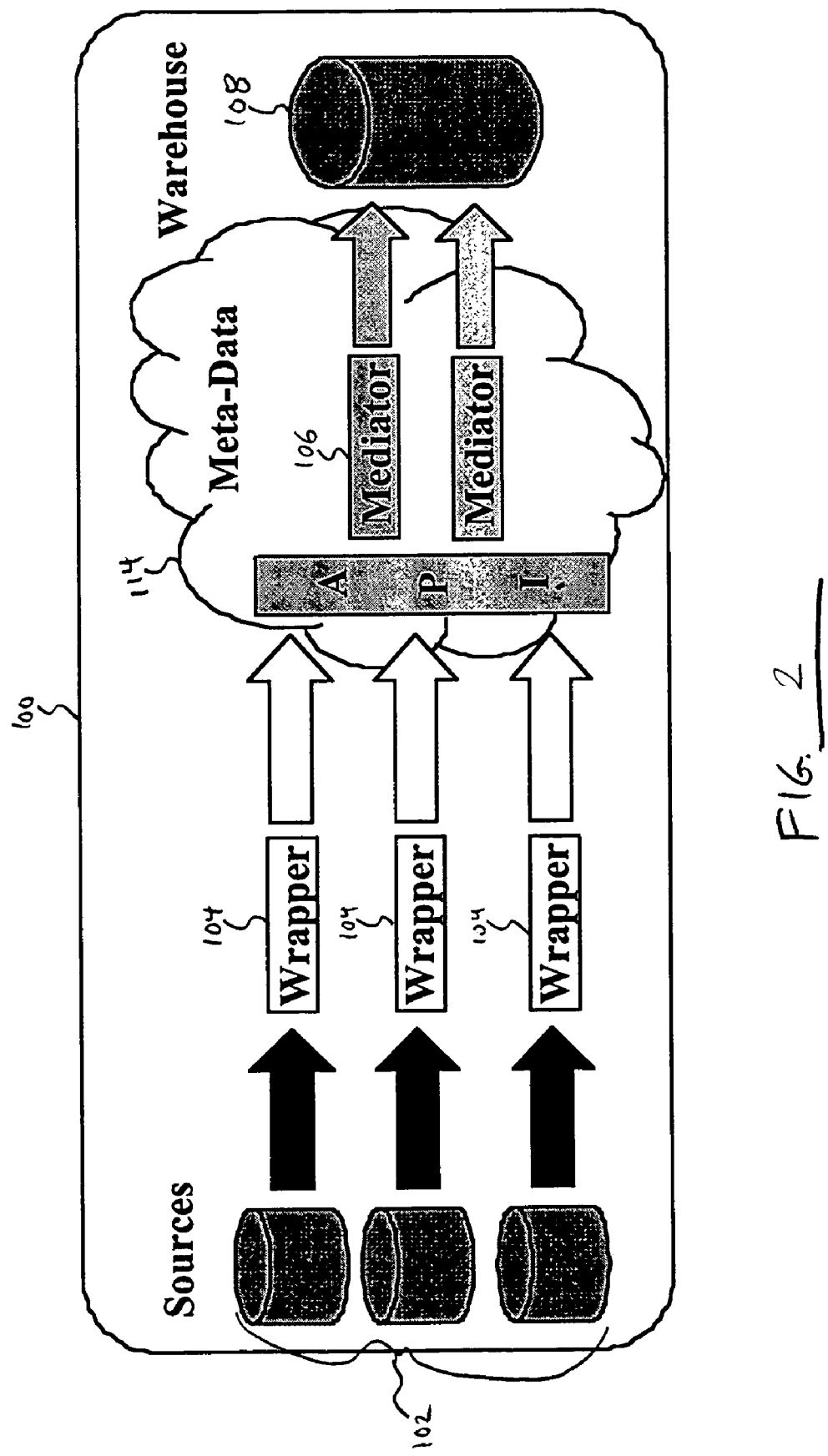
FIG. 2 is a second dataflow diagram of the system.

FIG. 1 is a dataflow diagram of a system 100 for integrating and accessing multiple data sources within a data warehouse architecture according to the present invention, and FIG. 2 is a second dataflow diagram of the system. As shown by 100, a data warehouse typically has 5 layers. The data sources 102 are external to the warehouse, and contain the original data. The wrappers 104 interact with the sources to retrieve information and parse the data into an internal representation. The mediators 106 take the information, transform it into the appropriate representation and enter the data into the warehouse 108. The warehouse 108 is a large data store, often a relational database, that contains a consistent representation of a subset of data contained in the data sources 102. Users 110 interact with the data through a set of well defined interfaces. The invention is both the unique way of generating mediators 106 by using a mediator generator program 112 and our set of well-defined metadata 114.

Figure 3:
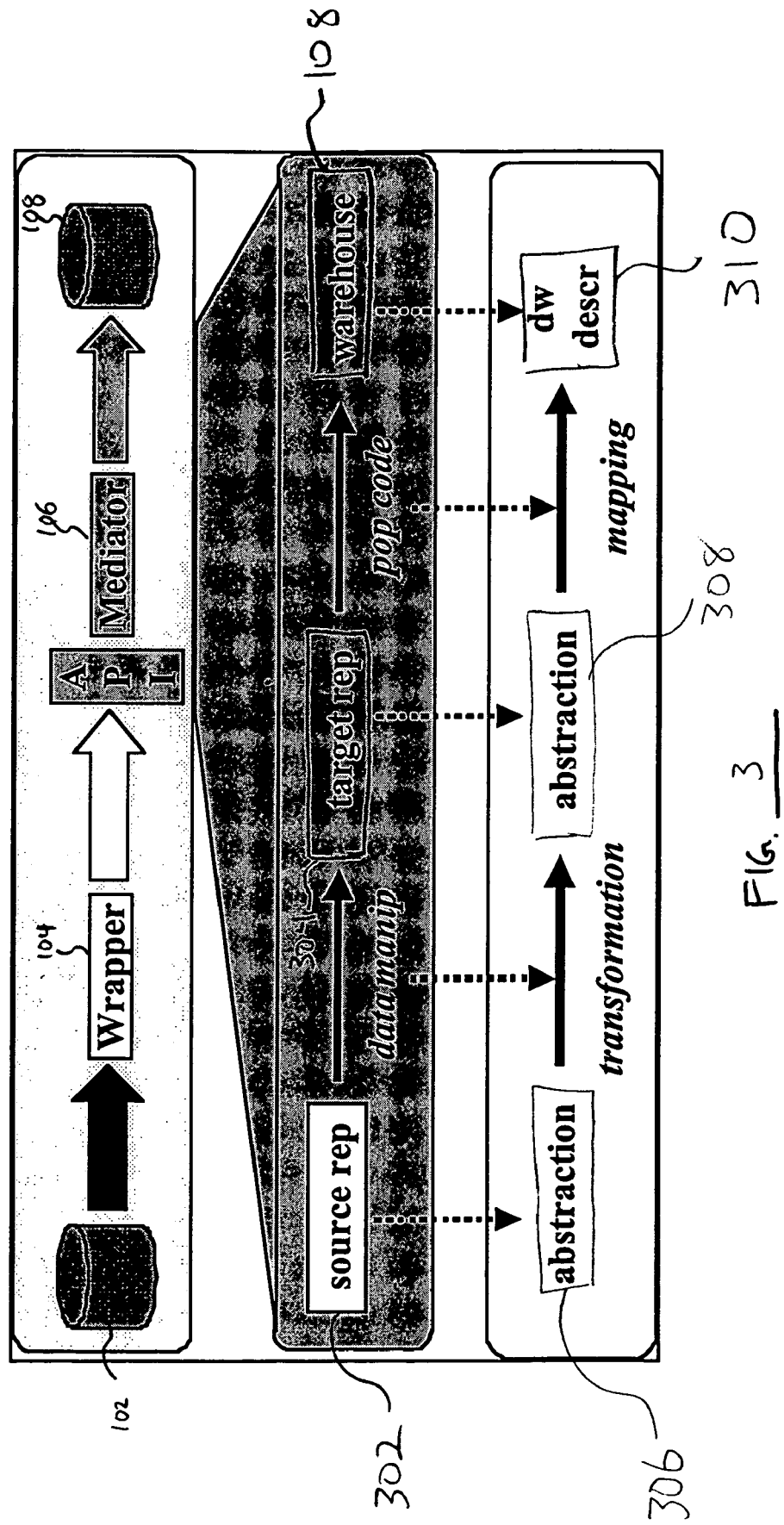
FIG. 3 is a dataflow diagram for metadata within the system.
Figure 8:
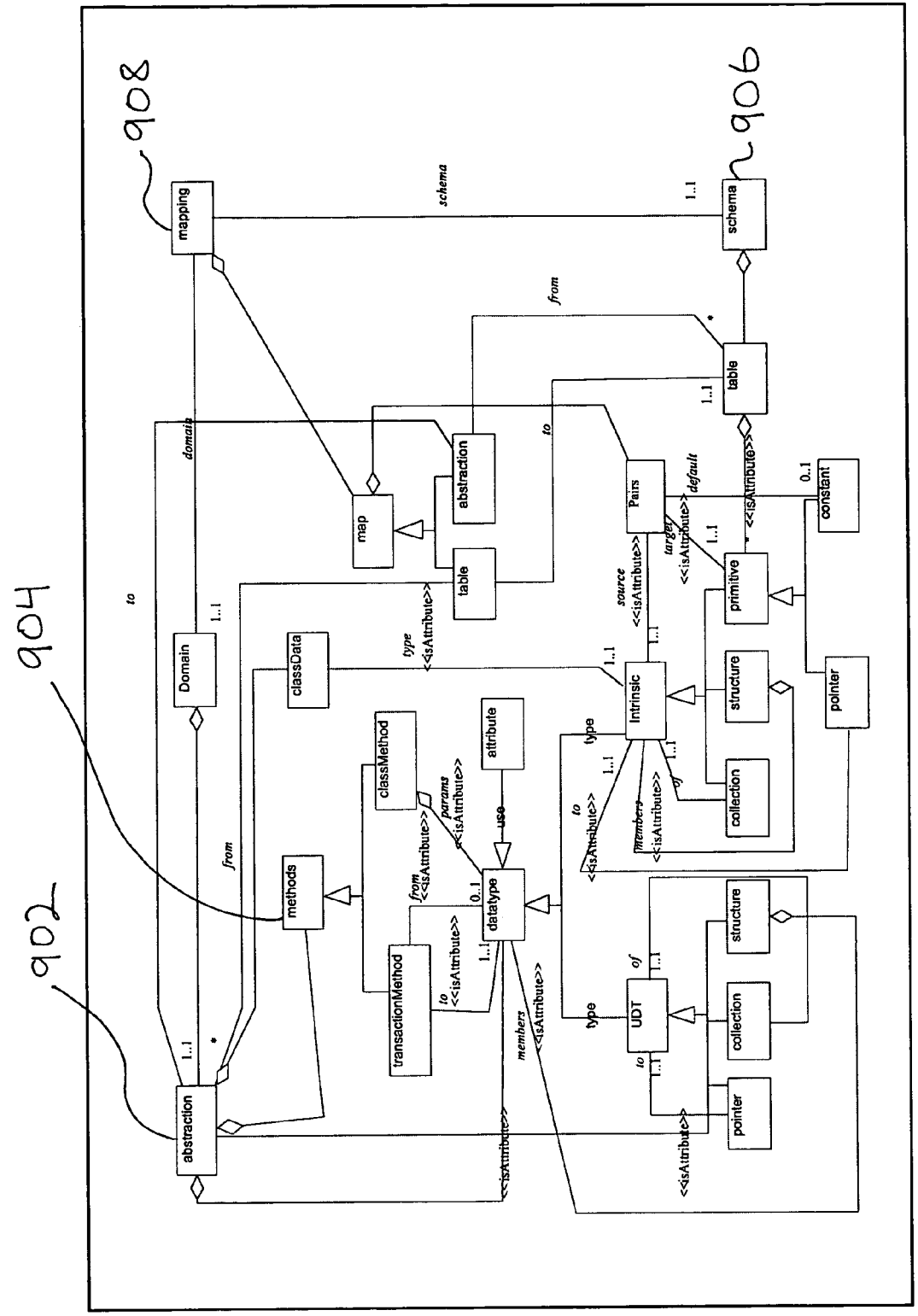
FIG. 8 is an Unified Modeling Language (UML) representation of the metadata schema.

FIG. 3 is a dataflow diagram for metadata within the system. To understand the type of information required to generate a mediator 106, in FIG. 3, we consider what functionality the mediator provides. The mediator takes data in a source representation 302, transforms it into a target representation 304 and then enters it into the warehouse 108. In other words, a mediator takes an abstract representation of a concrete object 306, transforms it into an alternative representation of the same concrete object 308, and maps it onto a database description 310. Automatically generating a mediator requires representing four types of information: abstractions 902 correspond to the different representations 306 and 308; transformations 904 describe how to map between different representations 302 and 304; database descriptions 906 correspond to 310; and mappings 908 describe how the abstractions 308 relate to the database tables 310. FIG. 8 presents a formalized description of the metadata in UML (Unified Modeling Language) format, a more intuitive description follows.

Figure 4:
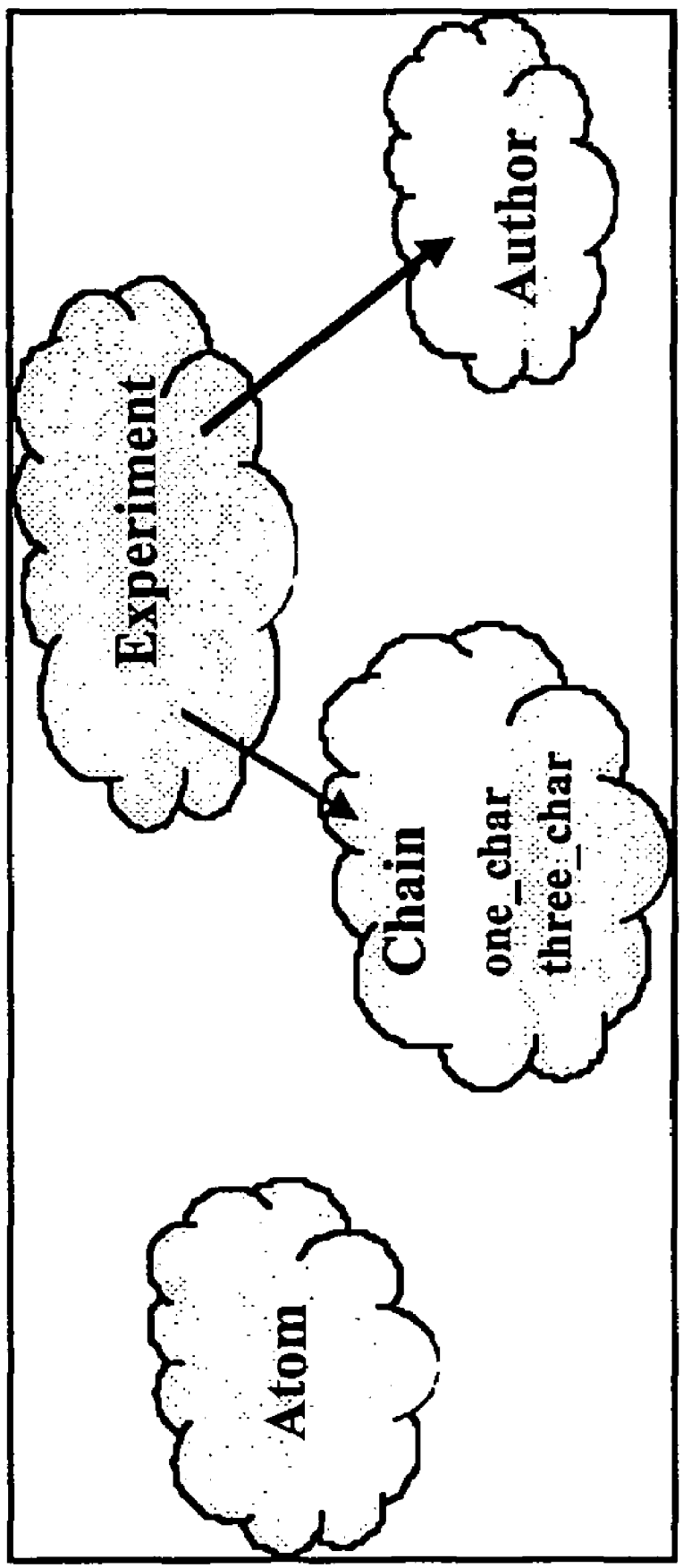
FIG. 4 is a relational diagram of an exemplary abstraction defined by the metadata.

FIG. 4 is a relational diagram of an exemplary abstraction defined by the metadata. Abstractions 902 are the core of the domain specific knowledge represented by the metadata. Conceptually, an abstraction encapsulates the different components and views of a particular domain-specific concept. Practically, an abstraction is the aggregation of all of a concept's associated attributes and representations, as presented by the participating databases. As such, the abstractions contain a superset of the information contained in any individual database.

Each abstraction inherits, directly or indirectly, from a distinguished abstraction class. The abstraction's attributes are optionally grouped into characteristics that combine related attributes and alternative representations of the same attribute. While this grouping has no affect on the mediator, it provides a mechanism to document the conceptual relationship between these attributes. Complex attributes can be defined in an abstraction, encouraging a natural description of the domain specific concepts. Attribute types may be primitives (i.e. integer, string, float, etc.), structures, arrays, or pointers to an instance of another class. Each attribute has an arity associated with it, representing the number of values it can or must have.

The possible values are:

key: the attribute is single valued, required and unique f_key class: the attribute is single valued and optional, but if it exists, its value must also occur in the key member of class 0: the attribute is optional and single valued. This is the default if no arity is specified.

num: the attribute has exactly the number of values specified by the integer value of num (ex, if num is 1, the associated attribute is required and single valued)

N: the attribute is optional and multi-valued

1_N: the attribute is multi-valued but must have at least 1 associated value

To ensure that abstractions remain a superset of the component databases, incorporating a new database requires updating them in two ways. First, any previously unknown concepts represented by the new data source must be incorporated into the class hierarchy. Second, any new representations or components of an existing abstraction must be added to its attribute list.

Database descriptions 906 are language independent definitions of the information contained within a single database. These definitions are used to identify the translations that must be performed when transferring data between a specific data source and target. The metadata representation of a database closely mirrors the physical layout of a relational database. There are two advantages to using this independent representation of the data. First, the database attributes have the same functional expressibility as the abstraction attributes described above. As a result, they are able to represent non-relational data sources, including object-oriented databases and flat files; a crucial capability when dealing with a heterogeneous environment. Second, the ability to comment the database descriptions improves warehouse maintainability by reducing the potential for future confusion. Class comments may be used to clarify the interactions with other classes, define or refine the concept associated with a table, etc. These comments are complimented by attribute comments that, while infrequently used for abstraction attributes, provide additional metadata about the attribute's purpose and representation.

Figure 7:
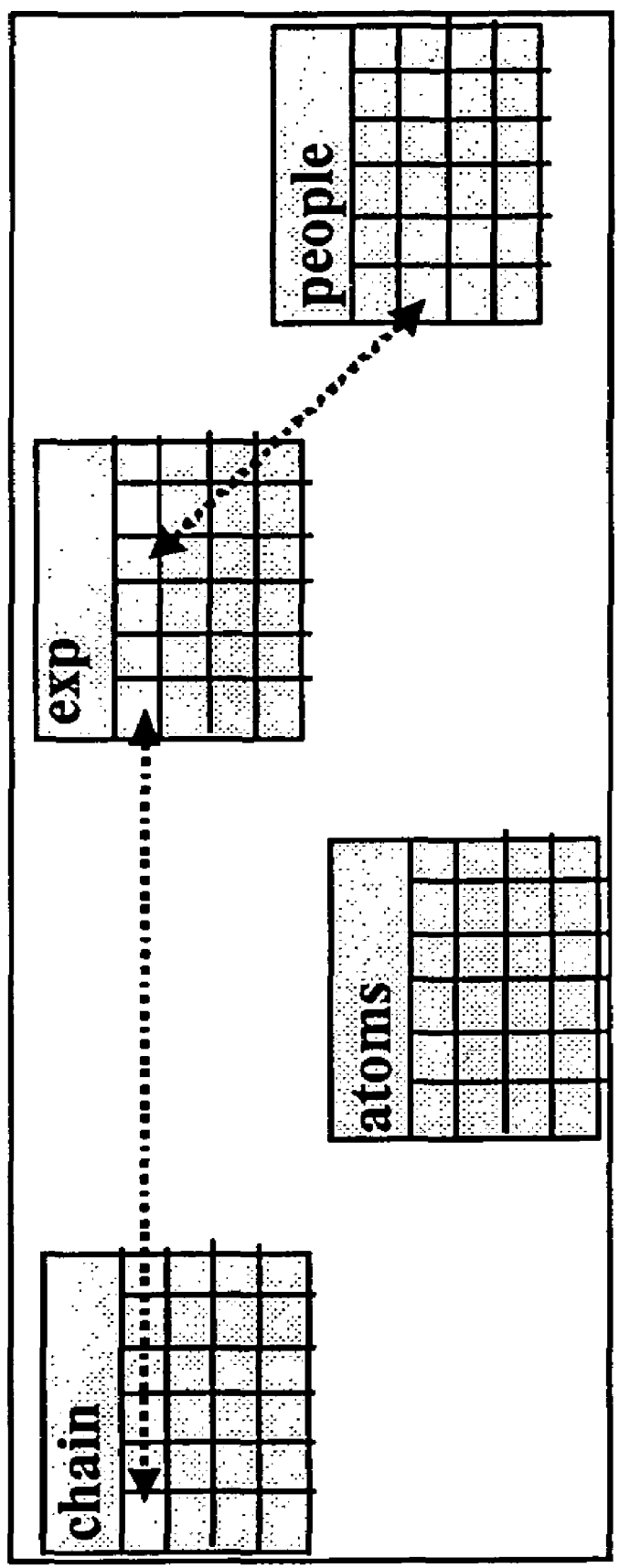
FIG. 7 is a relational diagram of an exemplary set of data structures used within the system.

FIG. 7 is a relational diagram of an exemplary database description defined by the metadata. As databases are integrated into the warehouse, their descriptions must be entered into the metadata, as must the descriptions for all target (i.e. warehouse) databases. Furthermore, as their schemata change the database descriptions and mappings contained within the metadata must be updated to reflect these changes. These modifications are made by the database administrator (DBA). Because of the similarity between the metadata and relational formats, it is possible to automatically generate most of the database description directly from the metadata associated with most commercial DBMSs; obviously the DBA must still explicitly enter any comments they wish to provide. However, because most flat file databases do not maintain any metadata, their metadata description must be manually defined.

Figure 5:
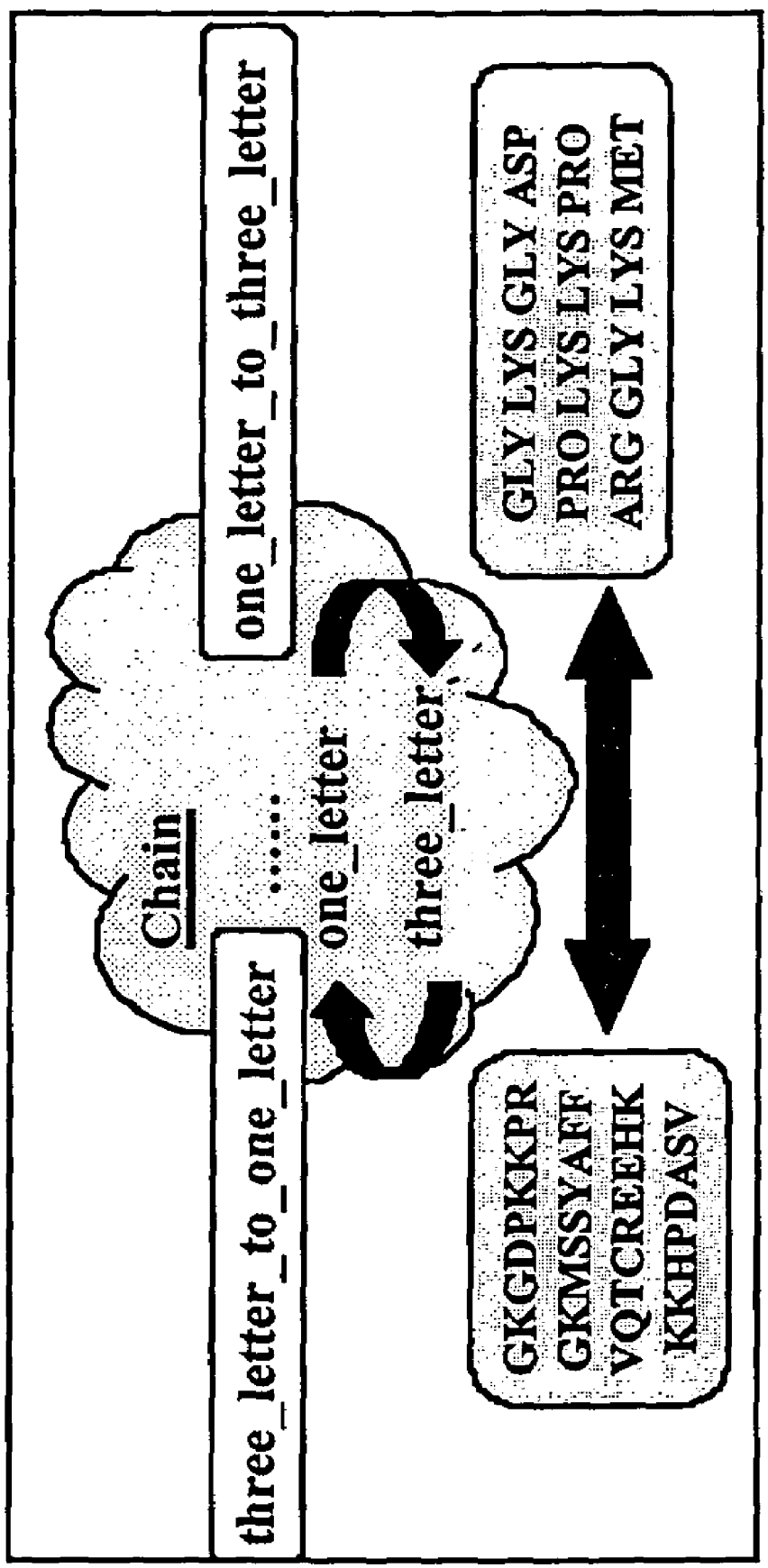
FIG. 5 is a relational diagram of an exemplary transformation defined by the metadata.

FIG. 5 is a relational diagram of an exemplary transformation defined by the metadata. Transformations 904 describe which attributes contain the same data, but in different formats, and identify the methods that can be used to translate between them. It is important to note that a sequence of method invocations may be required to obtain the desired representation. The metadata does not define these methods explicitly, instead it records their names, locations, and the participating attributes. These methods are restricted to operating only on class member variables and, as such, do not require any parameters. To provide the maximum flexibility, two other extensions may be associated with an abstraction, and thus shared with all its instances: class methods and class data. Class methods are called by other methods that require the ability to convert between representations, but do not require an instance of this class. Class data is useful for providing information such as a translation table that does not vary between instances of the class.

There are two benefits to identifying transformations in the metadata. First, and most obvious, it provides the final piece of knowledge required to generate the mediators. However, a subtler benefit is the combination of the transformation methods into a single library (8-5). By explicitly identifying these methods, and defining them in a single location, code re-use is encouraged and maintenance costs reduced.

Figure 6:
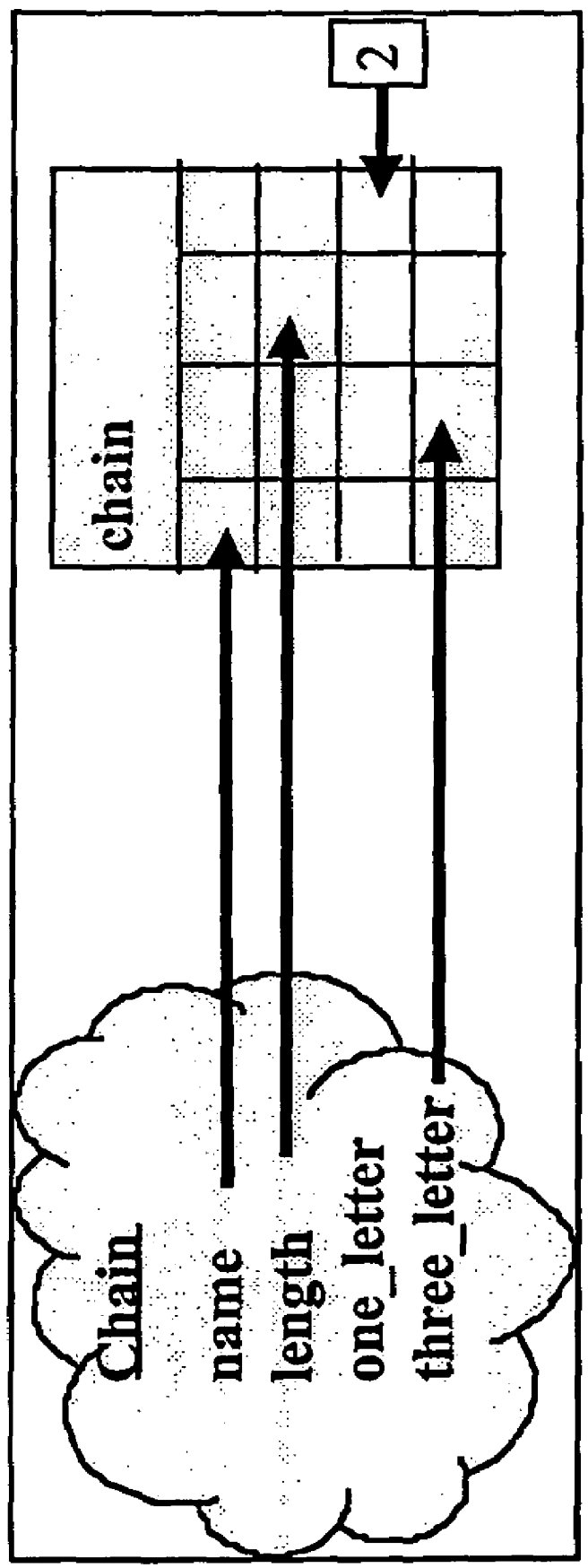
FIG. 6 is a relational diagram of an exemplary mapping defined by the metadata.

FIG. 6 is a relational diagram of an exemplary mapping defined by the metadata. Mappings 908 identify the correspondence between database descriptions and abstractions at both the class and attribute levels. In particular, several source classes are mapped onto a single target class to completely define an instance of the target class. When the source database is a data source 102, its classes comprise the possible source classes and the abstraction classes are the possible targets. The reverse mapping is used for the warehouse 108. Because abstractions are an aggregation of the individual databases, there is always a direct mapping between database and abstraction attributes. Due to representational differences, however, an abstraction may be split across several database classes and a single database class may be related to several abstractions. Ambiguity about which attributes should participate in the join may arise if there are multiple foreign key references in a single table. This ambiguity is resolved by explicitly identifying the join conditions in the mapping definition. Natural joins are used to combine tables when the abstraction attribute is required, otherwise outer-joins are performed.

FIG. 8 defines the DataFoundry metadata model using the Unified Modeling Language (UML). The schema of the four main components of the metadata (abstractions 902, mappings 908, database description 906, and transformation descriptions 904) are described in full detail in this UML diagram, as anyone familiar with the art will recognize. This diagram formalizes much of the previous discussion of FIGS. 3–7 by explicitly defining the attributes of each component of the metadata, as well as and the relationships between components and their attributes.

Figure 9:
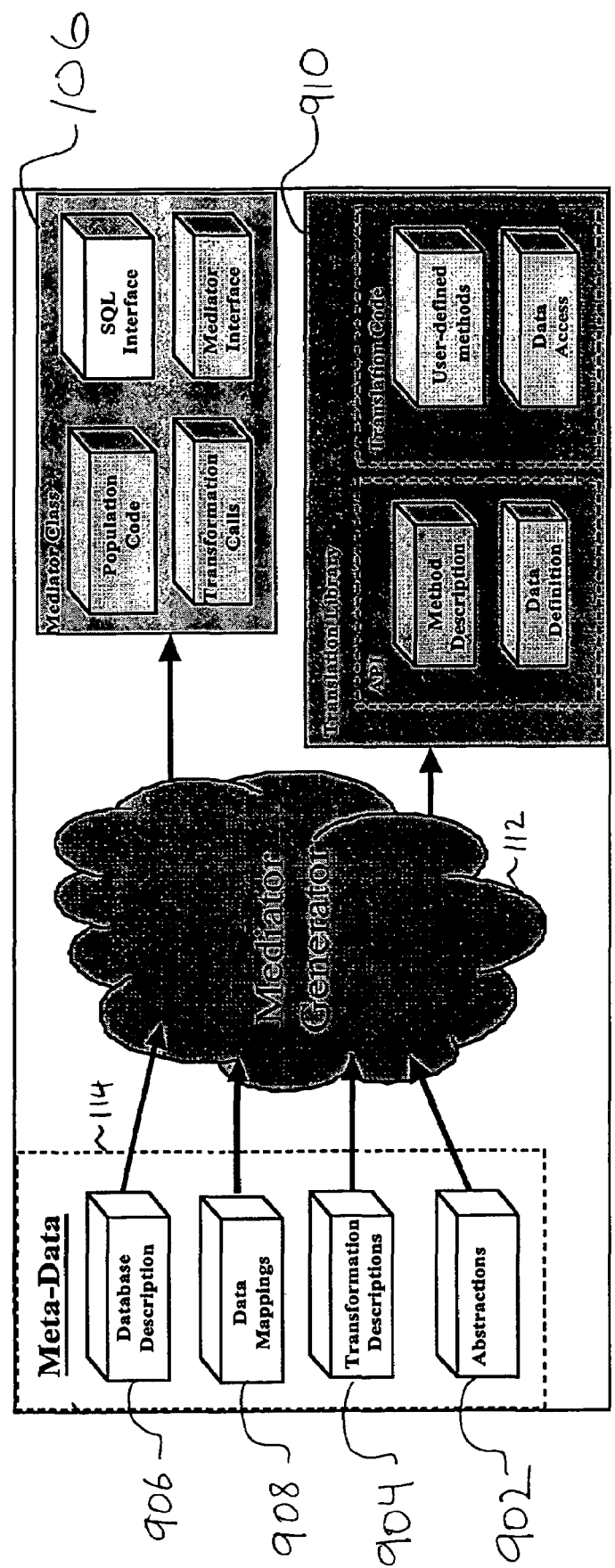
FIG. 9 is a relational diagram of a process used to create mediators.

FIG. 9 is a relational diagram of a process used to create mediators. Once the metadata 114 has been defined, the mediator generator 112 is used to generate the C++ classes and methods that comprise the mediator class 106. The mediator generator produces both a translation library 910 and a mediator class 106. The translation library represents the classes and methods associated with the abstractions 902, while the mediator classes are responsible for entering the data into the warehouse. The API available to the wrapper is a combination of the mediator class 106 and translation library 910 APIs. The process of obtaining these components from the metadata is relatively straightforward, and is therefore only discussed briefly.

Figure 10:
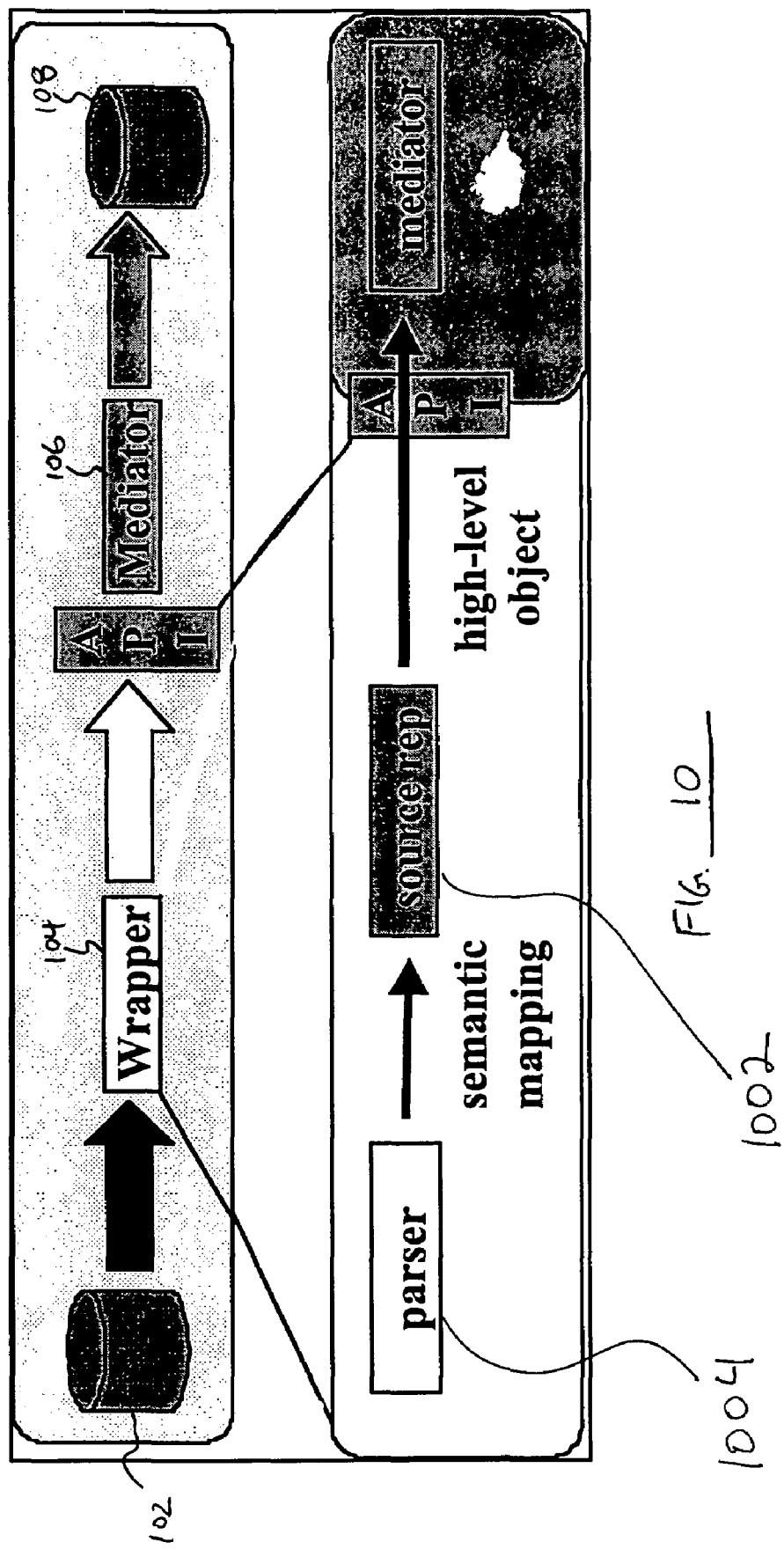
FIG. 10 is a dataflow diagram that gives a breakdown of the wrappers in the system.

FIG. 10 is a dataflow diagram for accessing data from a library using the system. The translation library encapsulates the class definitions and methods associated with the domain-specific abstractions. This information is created based on the information contained in the abstraction 902 and transformation 904 metadata. The mediator generator reads this metadata into an internal representation, then outputs a distinguished abstraction class, and one class for each metadata abstraction. The inheritance hierarchy for the output classes is the same as the abstraction hierarchy, except that the base classes inherit from abstraction. Abstraction provides all classes with a minimal amount of functionality, including access to both the source and target databases. The appropriate user defined extensions, as defined by the transformation metadata, are included in the class API. Class data and class methods are defined as static, class variables and methods. Transformation methods are declared as private methods—but the actual implementation is left up to the user.

The data members associated with a class correspond to the abstraction attributes; static data members are used to represent the class-data extensions. Primitive attributes types are replaced by specialized types that keep track of whether or not they have been defined. For example, attributes declared to be of type integer are recast as type mg_integer, which is a structure containing an integer value, and a boolean value assigned. Multi-valued abstraction attributes are represented as structures that have an additional data member, next_ptr, which is used to create a linked-list. Classes are also defined for complex data types, which are named based on the corresponding attribute name. For each attribute, the mediator generator defines two data access methods: one to read it (get), the other to write it (put). The get method calls appropriate translation methods in the translation library 910 to derive the value of the attribute if it is not currently available. Infinitely recursive calls are prevented by keeping track of the call stack, and not calling a method that depends on a value you are already trying to derive. Put methods set the value of attribute to be the input parameter. For multi-valued attributes, the new value is placed into the linked list of values. Because of their complexity, the mediator generator will not produce code that invokes any of the class methods.

In addition to forming the internal representation of the mediator, the translation library, as shown in FIG. 10, defines the internal data source representation 1002 used by the wrapper 104. This representation is used by the parser 1004 to represent the data from a source 102 before passing it on to the mediator 106.

Mediator class generation is only slightly more difficult than generating the translation library. For each target database schema 108, a mediator class is generated to perform the data transformations and enter the data into the warehouse. Different classes are used because the mappings vary depending on the warehouse schema, and using a pure data-driven approach to dynamically identify the appropriate transformations would be too slow. For each top-level abstraction, the generator creates a single mediator method, within the mediator class, to transfer the data contained in the abstraction instance to the warehouse. This method calls several private methods to recursive through all of the object's complex attributes and to find all possible mappings. For each method, the combination of available attributes is compared against the mapping metadata to determine if any mappings are satisfied. If a mapping becomes satisfied, code is created to enter data from the abstraction representation into the warehouse. This may require iterating over multiple values if the attributes are not single-valued. If the most recently added attribute contains attributes that reference other classes, code to continue the recursion is generated, with each of these attributes becoming the most recently added in turn. Again, this may require the code to iterate over instance values if the attribute is multi-valued.

As databases evolve and additional data sources are integrated, new database descriptions and mappings are defined by the DBA. These may, in turn, require adding new abstractions, extending the attribute set associated with an existing abstraction, and defining new translation methods. Incorporating a new data source requires the DBA to describe it, map the source attributes to corresponding abstraction attributes, ensure that all applicable transformation methods are defined, and create the wrapper. The mediator generator creates the new mediator class, and extends the API as needed. Once a database has been integrated, adapting to schema changes often requires only modifying the wrapper to read the new format.

While the present invention has been described with reference to a preferred embodiment, those skilled in the art will recognize that various modifications may be made. Variations upon and modifications to the preferred embodiment are provided by the present invention, which is limited only by the following claims.

We claim:

1. A method for maintaining a data warehouse, comprising:
   identifying a data source of interest;
   updating a metadata to reflect information available from said source, wherein said metadata comprises domain specific knowledge obtained by analyzing said data source, and wherein said metadata represents at least one abstract concept, at least one database description, at least one transformation and at least one mapping;
   automatically generating a mediator based on said metadata, wherein said mediator comprises data management code, wherein said code defines a translation library and a mediator class; and
   writing a wrapper for said source which calls said mediator, wherein said method is applied to data warehousing applications in the domain of functional genomics and proteomics.

2. The method of claim 1, wherein the step of updating a metadata comprises entering new types of information, new data formats for previously defined information, new transformations between data formats, and the schema of said source.

3. The method of claim 1, wherein said mediator is fully functional and is automatically generated by a stand-alone mediator generation program.

4. The method of claim 3, wherein said mediator generation program automatically defines an API and translation libraries.

5. The method of claim 4, wherein said mediator comprises code to translate between source and target representations, possibly using externally defined methods, and load data into said warehouse.

6. The method of claim 3, wherein said mediator generation program defines a public data representation, wherein said wrapper uses said public data representation.

7. The method of claim 3, wherein said wrapper uses said mediator to load data into said warehouse.

8. The method of claim 1, wherein said wrapper makes use of said mediator.

9. The method of claim 1, wherein said method is used for integrating a new data source into a data warehouse.

10. The method of claim 1, wherein said method is used for updating a warehouse when a previously integrated data source is modified.

11. The method of claim 1, wherein said method is used for integrating a new data source into a data warehouse.

12. The method of claim 1, wherein said method is used for updating a warehouse when a previously integrated data source is modified.

13. The method of claim 1, wherein said translation library provides a data representation for said domain specific knowledge, including at least one "get" and "set" method for at least one attribute, wherein said at least one "get" and "set" method calls at least one transformation method and derives a value of said at least one attribute if it is missing.

14. The method of claim 13, wherein said mediator class defines at least one method that takes at least one object as input and traverses a data structure of said at least one object and enters information into said data warehouse.

15. The method of claim 1, wherein said mediator class defines at least one method that takes at least one object as input and traverses a data structure of said at least one object and enters information into said data warehouse.

16. A method for maintaining a data warehouse, comprising:
   identifying a data source of interest;
   updating a metadata to reflect information available from said source, wherein said metadata comprises domain specific knowledge obtained by analyzing said data source, and wherein said metadata represents at least one abstract concept, at least one database description, at least one transformation and at least one mapping;
   automatically generating a mediator based on said metadata, wherein said mediator comprises data management code, wherein said code defines a translation library and a mediator class; and writing a wrapper for said source which calls said mediator, wherein said method is applied to data warehousing applications in the domain of protein sequence and structure analysis.

17. A computer-useable medium embodying computer program code for maintaining a data warehouse by executing the steps of:
- identifying a data source of interest;
- updating a metadata to reflect information available from said source, wherein said metadata comprises domain specific knowledge obtained by analyzing said data source, and wherein said metadata represents at least one abstract concept, at least one database description, at least one transformation and at least one mapping;
- automatically generating a mediator based on said metadata, wherein said mediator comprises data management code, wherein said code defines a translation library and a mediator class; and
- writing a wrapper for said source which calls said mediator, wherein said method is applied to data warehousing applications in the domain of functional genomics and proteomics.

18. The computer-useable medium of claim 17, wherein the step of updating a metadata comprises entering new types of information, new data formats for previously defined information, new transformations between data formats, and the schema of said source.

19. The computer-useable medium of claim 17, wherein said mediator is fully functional and is automatically generated by a stand-alone mediator generation program.

20. The computer-useable medium of claim 19, wherein said mediator generation program defines a public data representation, wherein said wrapper uses said public data representation.

21. The computer-useable medium of claim 19, wherein said wrapper uses said mediator to load data into said warehouse.

22. The computer-useable medium of claim 17, wherein said mediator generation program automatically defines an API and translation libraries.

23. The computer-useable medium of claim 22, wherein said mediator comprises code to translate between source and target representations, possibly using externally defined methods, and load data into said warehouse.

24. The computer-useable medium of claim 17, wherein said wrapper makes use of said mediator.

25. The computer-usable medium of claim 17, wherein said method is used for integrating a new data source into a data warehouse.

26. The computer-usable medium of claim 17, wherein said method is used for updating a warehouse when a previously integrated data source is modified.

27. A computer-useable medium embodying computer program code for maintaining a data warehouse by executing the steps of:
- identifying a data source of interest;
- updating a metadata to reflect information available from said source, wherein said metadata comprises domain specific knowledge obtained by analyzing said data source, and wherein said metadata represents at least one abstract concept, at least one database description, at least one transformation and at least one mapping;
- automatically generating a mediator based on said metadata, wherein said mediator comprises data management code, wherein said code defines a translation library and a mediator class; and
- writing a wrapper for said source which calls said mediator, wherein said method is applied to data warehousing applications in the domain of protein sequence and structure analysis.

28. A method for maintaining a data warehouse, comprising:
- identifying a data source of interest;
- updating a metadata to reflect information available from said source, wherein said metadata comprises domain specific knowledge obtained by analyzing said data source, and wherein said metadata represents at least one abstract concept, at least one database description, at least one transformation and at least one mapping;
- automatically generating a mediator based on said metadata, wherein said mediator comprises data management code, wherein said code defines a translation library and a mediator class; and
- writing a wrapper for said source which calls said mediator, wherein said method is applied to data warehousing applications in the domain of astrophysics and climate modeling.

* * * * *